United States Patent [19]

Torborg

[11] Patent Number: 5,489,113
[45] Date of Patent: Feb. 6, 1996

[54] VEHICLE WITH HYDRAULICALLY ADJUSTABLE TIE ROD

[75] Inventor: David H. Torborg, Eagan, Minn.

[73] Assignee: Ag-Chem Equipment Company, Inc., Minnetonka, Minn.

[21] Appl. No.: 220,237

[22] Filed: Mar. 30, 1994

[51] Int. Cl.[6] ................ B60B 35/10; B62D 7/20
[52] U.S. Cl. ............ 280/638; 280/95.1; 180/906; 180/209; 180/159; 180/163; 301/128; 74/586
[58] Field of Search ................ 280/638, 95.1; 180/906, 209, 155, 159, 162, 163; 301/128; 74/586

[56] References Cited

U.S. PATENT DOCUMENTS

| | | | |
|---|---|---|---|
| 1,967,283 | 7/1934 | Brown | 180/209 X |
| 2,173,419 | 9/1939 | Johnson | 180/906 |
| 4,039,094 | 8/1977 | Grove | 180/906 |
| 4,120,507 | 10/1978 | Miller | 280/95.1 |
| 4,359,123 | 11/1982 | Haupt et al. | 180/906 |
| 4,449,600 | 5/1984 | Telfer | 180/155 |
| 5,039,129 | 8/1991 | Balmer | 180/906 |
| 5,121,808 | 6/1992 | Visentini et al. | 180/906 |
| 5,282,644 | 2/1994 | Larson | 280/638 |

FOREIGN PATENT DOCUMENTS

| | | | |
|---|---|---|---|
| 61-220902 | 10/1986 | Japan | 180/906 |
| 0301104 | 12/1988 | Japan | 301/128 |
| 0249502 | 10/1989 | Japan | 301/128 |
| 1-257669 | 10/1989 | Japan | 180/906 |

*Primary Examiner*—Karin L. Tyson
*Assistant Examiner*—Peter C. English
*Attorney, Agent, or Firm*—Larkin, Hoffman, Daly & Lindgren, Ltd.

[57] ABSTRACT

A tie rod assembly for a steering wheel structure for an agricultural vehicle such as a row crop applicator uses hydraulic cylinders to set the track width of the vehicle. The track width may be modulated between a minimum and a maximum track setting and modified until a desired track width is achieved while the vehicle is in motion and negotiating a turn without affecting toe-in settings. Toe-in settings are maintained by a closed loop series hydraulic system which further has the capability to reinitialize any toe-in setting to a preset condition in the event any hydraulic cylinder experiences cylinder drift.

14 Claims, 10 Drawing Sheets

PRESSURE PILOTS
2-WAY VALVE CLOSED

PRESSURE PILOTS
2-WAY VALVE CLOSED

VEHICLE WITH HYDRAULICALLY ADJUSTABLE TIE ROD

CROSS-REFERENCE TO RELATED APPLICATIONS

This application is related to U.S. application Ser. No. 07/996,290, filed Dec. 23, 1992 in the name of Roger Larson, entitled "Hydraulically Adjustable Tie Rod for an Agricultural Vehicle with an Adjustable Axle", now U.S. Pat. No. 5,282,644.

BACKGROUND OF THE INVENTION

1. Field of the Invention

This invention relates generally to farming row crop applicators having adjustable track widths, and more specifically to row crop applicators having adjustable length tie rods adapted to the steerable axle.

2. Description of the Prior Art

Row crop applicators are widely used in the farming industry for applying fertilizer about a field to maximize crop yield. Since different crops are planted in rows having pre-selected row widths, depending on the crop to be grown, the row crop applicator machinery needs to have adjustable track widths such that the tires of the applicator can be driven in the rows defined between the rows of crop. Typical row crop applicators have a track width adjustable between 120 and 152 inches.

Four wheeled row crop applicators have an axle assembly including a tie rod extending between a pair of steering structures for maintaining a pre-selected toe-in setting. Consequently, when the track width of the steering assembly is adjusted in the longitudinal direction, the length of the tie rod needs to be adjusted in the longitudinal direction in step therewith. Prior art steering axle assemblies are typically adjusted hydraulically. However, presently available tie rods are typically comprised of a rod telescopingly received within a tubular member, wherein a set pin can be selectively removed therefrom such that the inner rod member can telescope within the tubular member when the track width is adjusted such as disclosed in U.S. No. 5,121,808 to Visentini et al., issued Jun. 16, 1992 entitled "Adjustable Gauge Steering Axle". One or more set pins are then subsequently reinserted through a pair of holes defined in both the tubular member and the telescoping rod to secure the inner rod to the tubular member. These holes are typically defined in four (4) inch increments, wherein the operator has to manually insert and remove the pins during the track width adjustment procedure.

One major problem with prior art equipment is that the toe-in setting defined by the wheel assemblies needs to be reset whenever the track width is established between a minimum and maximum setting. Further, since the holes in the tie rod assembly are defined every four (4) inches, the operator needs to repeatedly fine tune the track width adjustment until the holes of the inner rod and the outer tubular member are perfectly aligned so that the set pin can be disposed therein. These processes are time consuming, tedious and potentially dangerous as the operator needs to be positioned beneath the front of the tractor chassis. Further, the track width of the row crop applicator can only be adjusted in four (4) inch increments, and is not adjustable in negligible increments. Some crops are planted in rows as narrow as 24 inches, and since the track widths of tractor wheels can sometimes extend up to 12 inches, a four inch track width adjustment increment does not provide adequate fine tuning of a desirable track width.

Typically, independent contractors are hired by the farmer to treat a field. The track width of the contractor's row crop applicator is usually not initially appropriate for the intended field to be treated with fertilizer when the contractor arrives to the field. Thus, the independent contractor is required to adjust the track width, and reset the toe-in. Treating several different fields in a day may require setting several different track widths, which is time consuming and inefficient. When the independent contractor is under severe time limitations to treat many fields with fertilizer in a very narrow time window, which can be dictated by the weather or other uncontrollable circumstances, valuable time is lost during the repeated track width adjustments. Thus, the independent contractor stands to benefit from the present invention. However, even the farm owner can benefit from an improved adjustable tie rod arrangement since the typical farmer plants more than one type of crop, each having different row widths. Hence, having a row crop applicator with an a track width adjustable in increments that are negligible or as large as the overall maximum track width, or any size in between a minimum and maximum track width would benefit the average farmer as well.

The present invention overcomes many of the attendant disadvantages of existing systems by providing a row crop applicator with a steering structure having an adjustable track width, wherein a hydraulically adjustable tie rod can be adjusted in any size increments, while driving the machine, in a secure arrangement between a first and second track width setting, without the need to mechanically lock the steering structure while making the adjustment.

Another feature of the prevent invention is the provision of an adjustable tie rod assembly which will automatically correct for any cylinder drift that could cause the wheel toe-in adjustment to change.

SUMMARY OF THE INVENTION

The disadvantages and limitations of the background art discussed above are overcome by the present invention which includes an adjustable tie rod assembly that can be adjusted in any size increments, while driving the machine, in a secure arrangement between a first and second track width setting, without the need to mechanically lock the steering structure while making the adjustment. The inventive hydraulically adjustable tie rod assembly automatically corrects any cylinder drift that could cause the wheel toe-in adjustment to change on a vehicle such as a row crop applicator having a steering structure with an adjustable track width.

The inventive tie rod assembly uses back-to-back check valves with a mechanical pilot spool built into the tie rod cylinder and one of the track adjust cylinders to allow corrective adjustments of wheel toe-in. In actual operation, the track adjust cylinder without a back-to-back check valve is always retracted first. Subsequently, the track adjust cylinder with a back-to-back check valve is retracted forcing hydraulic fluid into the rod end of the tie rod cylinder. If the tie rod cylinder were to be fully retracted before the track adjust cylinder with a back-to-back check valve, a condition resulting from toe-in drift, the back-to-back check valve in the tie rod cylinder is piloted open mechanically. This allows hydraulic fluid to bypass through the tie rod cylinder, thereby allowing complete retraction of the track adjust cylinder which contains a back-to-back check valve. In a like manner, if the track adjust cylinder with a back-to-back check valve fully retracts first, a condition caused by toe-out drift, the internal back-to-back check valve in the track adjust cylinder is mechanically piloted open, allowing hydraulic fluid to by-pass, thereby allowing the tie rod cylinder to also fully retract.

BRIEF DESCRIPTION OF THE DRAWINGS

Other features and advantages of the present invention will become apparent to those skilled in the art through the Description of the Preferred Embodiment, claims and drawings herein, wherein like numerals refer to like elements, in which:

DESCRIPTION OF THE PREFERRED EMBODIMENT

Figure 1:
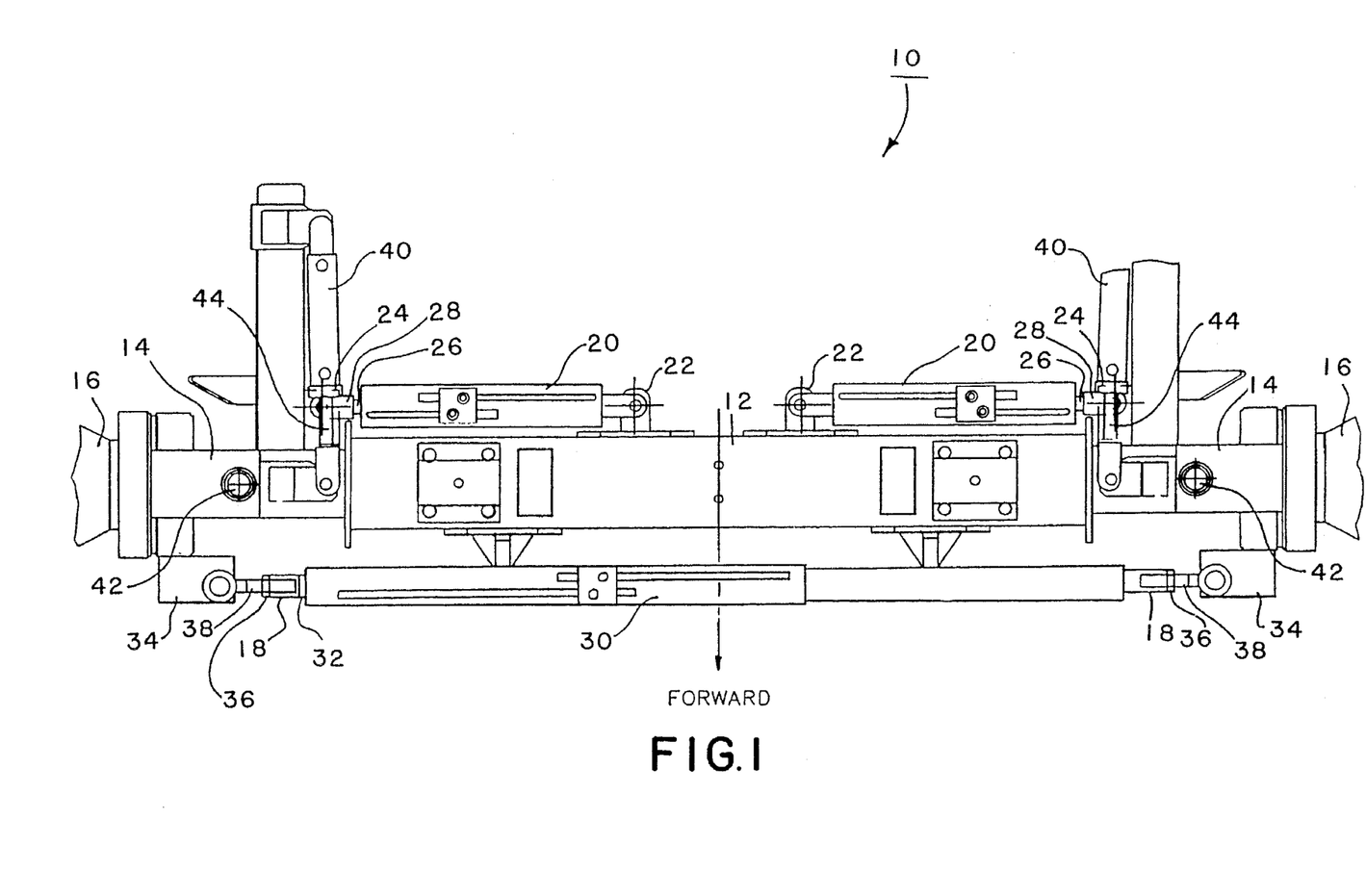
FIG. 1 is a top view of a front steering axle assembly having a variable track width and a variable tie rod assembly, where the track width and tie rod assembly are simultaneously adjustable in any size increments between a minimum and maximum track width.

Referring to FIG. 1, a top view of front wheel steering assembly 10 is shown, illustrating an improved variable tie rod assembly adjustable in any size increments between a minimum and maximum track width according to the present invention. Front wheel steering assembly 10 includes a rigid, tubular axle housing 12 extending laterally across and secured to a track chassis (not shown) typically 8" square. Axially disposed therein, is a pair of telescoping tubes 14, each extending from approximately a center of axle housing 12 and beyond a respective distal end thereof, each approximately 6" square. Each tube 14 can be adjusted in the lateral direction from an inner most position, as shown, outwardly in the lateral direction up to approximately 16" to provide an overall track adjustment range of 32". However, limitation to this adjustable track width range is not to be inferred from this particular embodiment.

A steering structure 16 is rotatably coupled to the distal end of each respective tube member 14. Each steering structure 16 is steered in unison with the other, wherein each is maintained relative to the other to define a toe-in setting. The toe-in setting can be selectively adjusted by adjusting the length of either toe adjusting member 38. Each tubular member 14 can be adjusted in the lateral direction, independently by injecting and removing hydraulic fluid from chambers of a respective hydraulic cylinder 20, which will be hereinafter discussed in considerable detail.

Still referring to FIG. 1, a pair of hydraulic cylinders 20 are shown which are each fixedly attached at an inner end to a bracket 22, wherein bracket 22 is secured and welded to the periphery of axle housing 12.

The opposing end of each telescoping hydraulic cylinder 20 is securingly coupled to telescoping member 14 via a bracket 24, which is similar to bracket 22, and which is secured to the distal end of an extendable piston rod 26. Piston rod 26 is selectively adjustable in the longitudinal direction within cylinder 20, and is axially disposed therein. By extending piston rod 26 outward in the axial direction, using hydraulic fluid as will be discussed shortly, bracket 24 is moved therewith to impart longitudinal movement in step with tubular telescoping member 14.

The inventive adjustable tie rod assembly 10 is further comprised of a rigid, tubular housing 30 having a telescoping piston rod 32 axially defined therein. Rod 32 is securingly fastened to toe-in adjustment member 18, which in turn is pivotally secured to a bracket 34 of respective steering structure 16. Bracket 34 is secured via welding to the respective tubular member 14. It is particularly noted that both brackets 34 and brackets 24 are rigidly secured to the extended portion of telescoping member 14. Thus, as one telescoping member 14 is displaced in a unit increment within axle housing 12, both respective rods 26 and 32 are adjusted in equal unit length in the longitudinal direction as well. Hence, adjustment of members 14, 26 or 32 causes the other two members to be incremented in step therewith. The toe-in defined by each wheel can be selected by using adjusting member 38 by rotating a hex nut 36 such that a rod 38 can be axially displaced within member 18, wherein hex nut 36 is subsequently resecured.

As will be discussed further, piston rod 26 can be axially displaced within respective cylinder 20 by injecting and removing hydraulic fluid within cylinder 20. Similarly, piston rod 32 can be axially adjusted within tie rod cylinder 30 by injecting and removing hydraulic fluid from chambers defined therewithin.

Steering is accomplished by a pair of hydraulic cylinders 40, which cause each respective steering structure 16 to pivot about a kingpin 42 and with respect to the distal end of respective tubular members 14. Each hydraulic cylinder 40 includes an axially received piston rod 44 which is displaced in a longitudinal direction, in unit steps with one another, to facilitate a steering structure, which is well-known in the art.

Figure 2:
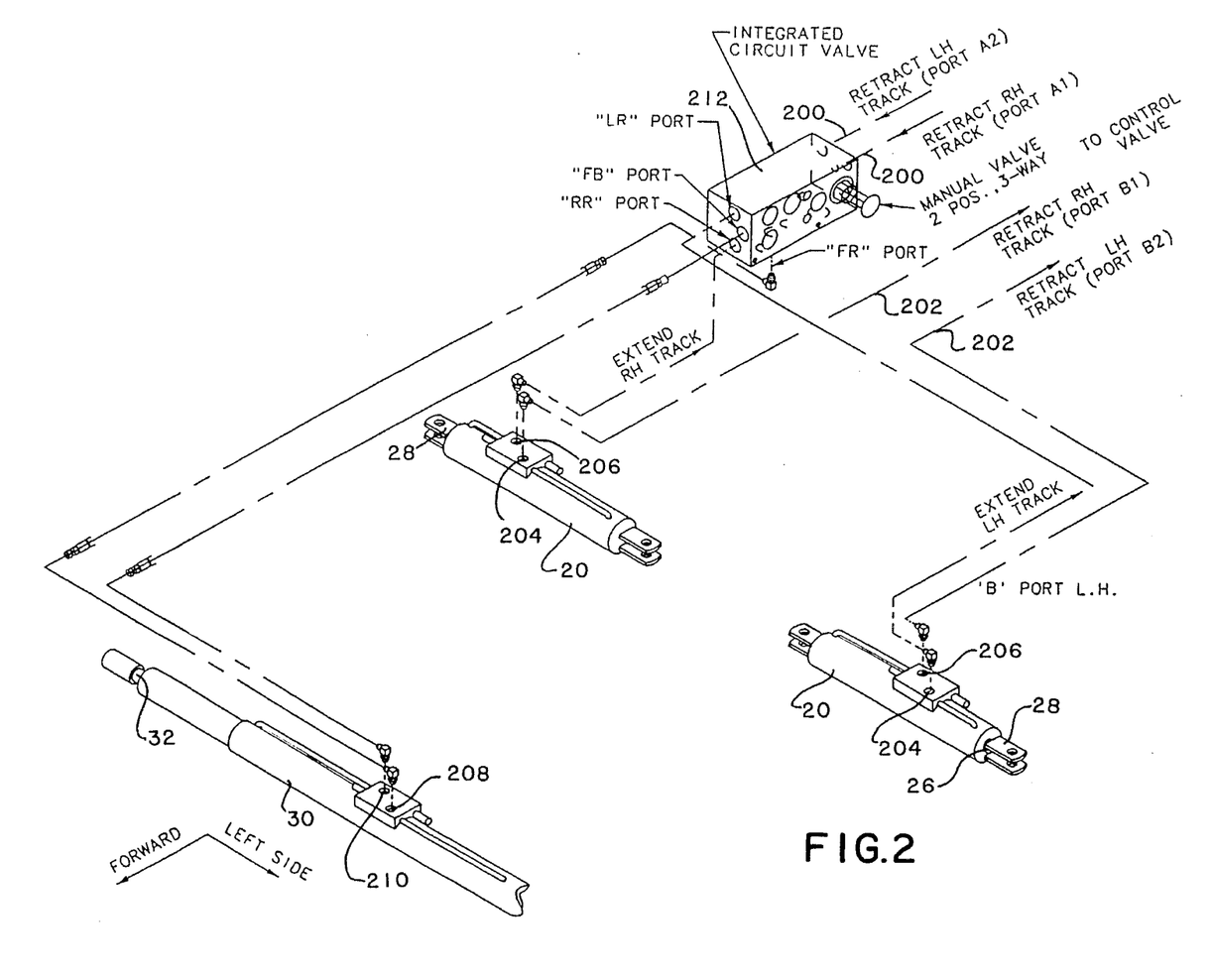
FIG. 2 is an exploded perspective view of the hydraulic network for controlling the telescoping track adjust cylinders and the telescoping tie rod, the right or the left track adjust cylinder and telescoping tie rod being simultaneously hydraulically extended or retracted during the track width adjustment procedures.

Moving to FIG. 2, the hydraulic arrangement for controlling the extension or retraction of cylinder rods 26 within cylinders 20 and tie rod 32 within tie rod cylinder 30 will now be discussed in considerable detail. As shown, hydraulic fluid is injected or extracted via a first pair of passage ways 200 and a second pair of passage ways 202. To impart longitudinal movement of piston rod 26 and extend bracket 28 from the cylinder housing 20, hydraulic fluid is injected into a respective line 202 into an aperture 204 defined in the respective cylinder 20. Concurrently, hydraulic fluid is removed via a second aperture 206 defined in respective cylinder 20. The apertures 204 and 206 of each cylinder 20 communicate hydraulic fluid to chambers defined on opposite sides of the piston defined about each respective piston rod 26, as will be described later in reference to FIGS. 3–8. Similarly, to retract rods 26 and 32 within the respective housings, fluid is injected and retracted in opposite directions via lines 200 and 202.

To increase the track width of front wheel steering assembly 10, hydraulic fluid is injected via a respective line 202 into the respective cylinder 20 and removed via line 200. Also, concurrently, hydraulic fluid is injected into the respective half of tie rod cylinder 30 via aperture 208, for example, to extend steering structure 16 for the right hand side and simultaneously ejected from aperture 210.

As described hereinbefore, if only the right steering structure 16 is to be extended hydraulic fluid is only injected into and removed from the right cylinder 20, and tie rod cylinder 30 piston rod 32 is extended in step therewith. A variety of hydraulic couplings are provided for adapting hydraulic lines between an integrated circuit valve 212 and each of the ports defined in track adjust cylinders 20 and tie rod cylinder 30, as shown in FIG. 2.

Because the "rod end" of cylinder 20 and the "base end" of cylinder 30 have the same area and the circuit is hydraulically driven in series, when extending cylinder 20 piston rod 26 equal amounts of hydraulic oil are removed from the rod end of cylinder 20 and injected into the base end of cylinder 30 thereby moving cylinder 30 piston rod 32 in step with cylinder 20 piston rod 26.

Figure 3:
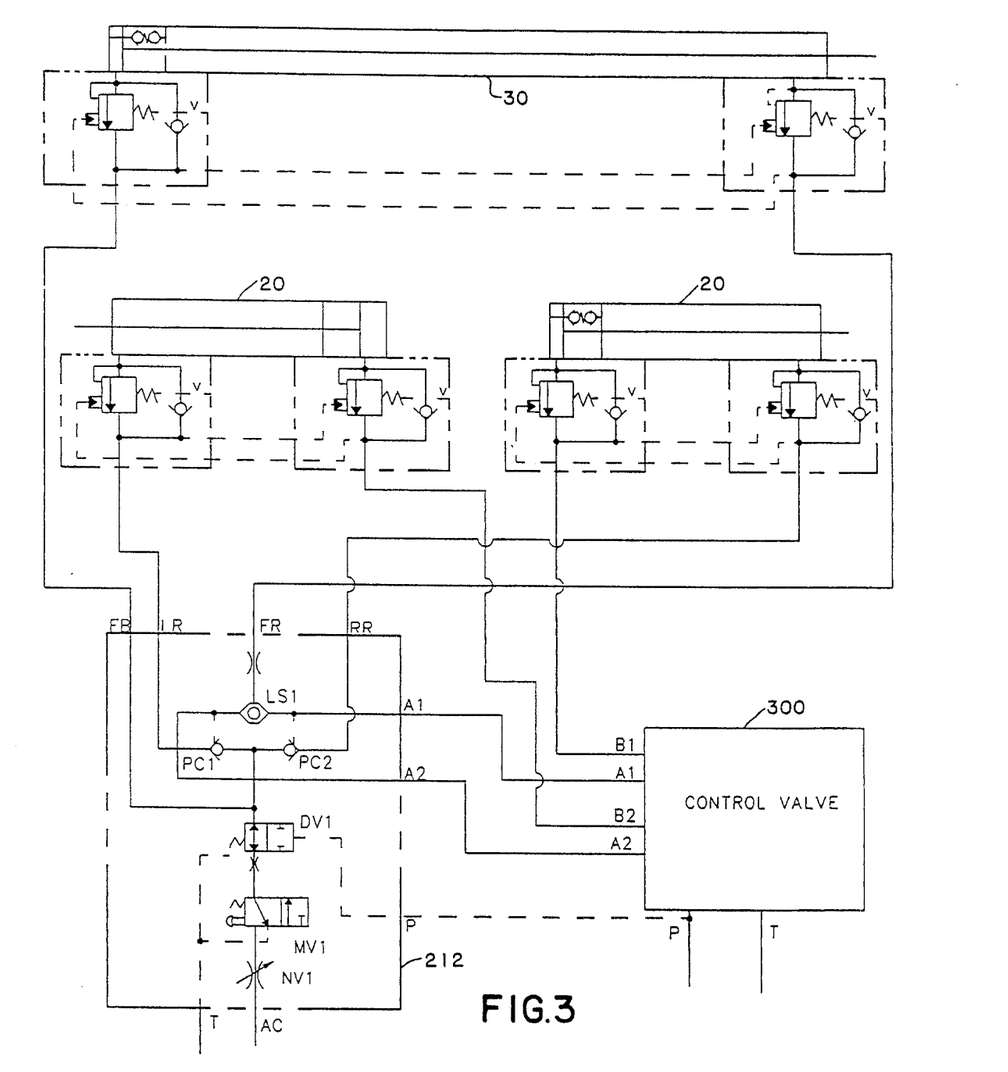
FIG. 3 is a schematic view of the hydraulic system for controlling each of the track adjust cylinders and the tie rod cylinder, wherein each track adjust cylinder is capable of being controlled independently.

Referring now to FIG. 3, a schematic diagram of the hydraulic system is illustrated to further clarify how hydraulic fluid is communicated between a hydraulic control valve 300, tie rod cylinder 30 and each track adjust cylinder 20. As schematically illustrated, either the left or right track adjust cylinders 20 can selectively be controlled.

Figure 4:
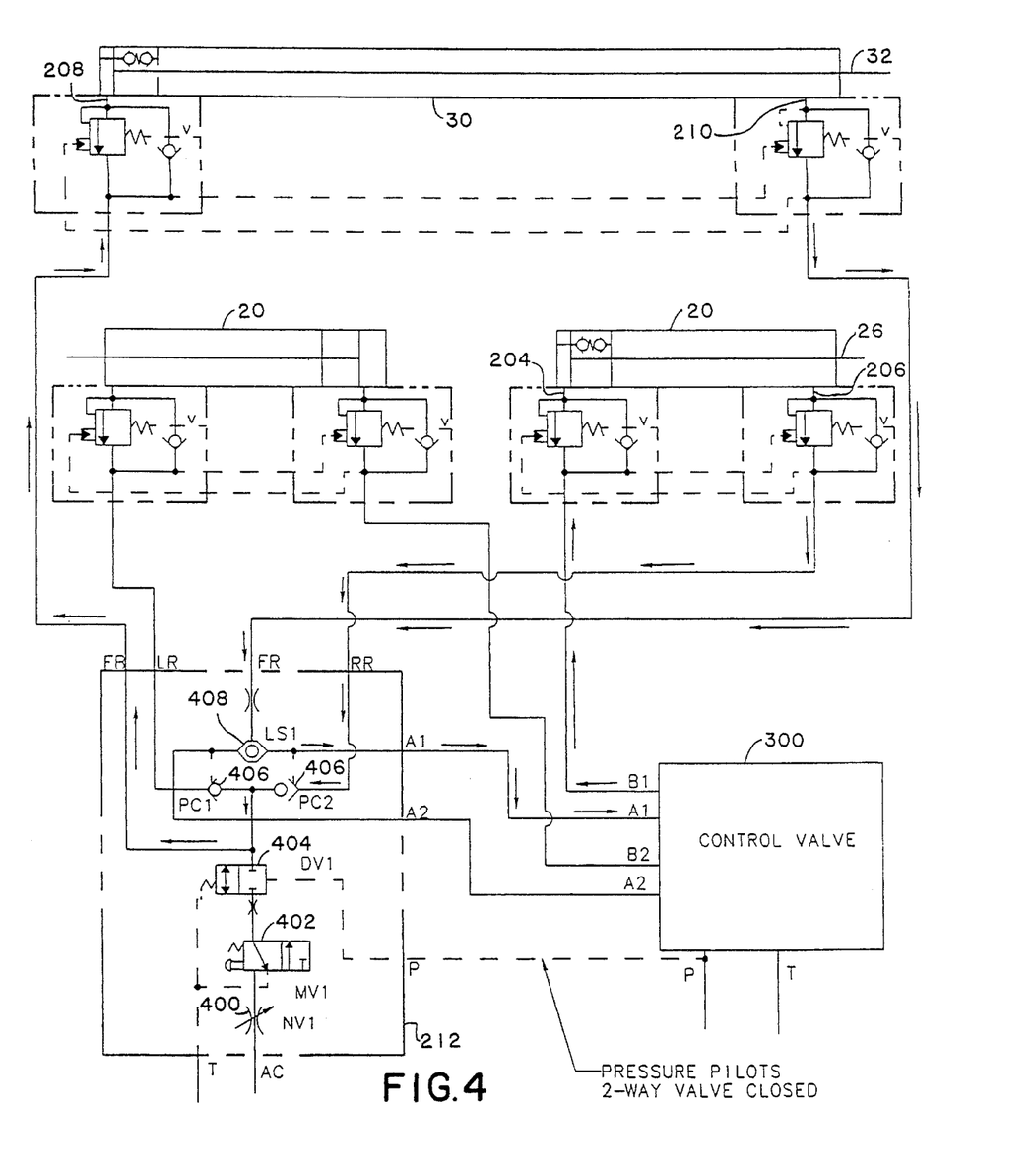
FIG. 4 is a schematic view of the hydraulic system for controlling each of the track adjust cylinders and the tie rod cylinder, illustrating hydraulic fluid flow during extension of the right hand track adjust cylinder.

FIG. 4 illustrates how the inventive hydraulically adjustable front wheel steering assembly 10 operates to extend tie rod cylinder 30 piston rod 32 and right hand track adjust cylinder piston rod 26 of right hand track cylinder 20 to extend steering structure 16 for the right hand side of inventive assembly 10. To extend tie rod cylinder piston rod 32 and the right hand track cylinder piston rod 26 of the right hand track adjusting cylinder 20, hydraulic fluid is communicated from hydraulic control valve 300 via aperture 204 into right hand track adjusting cylinder 20. Consequently, hydraulic pressure pilots two-way valve 404 closed whenever a track is being adjusted, and subsequently opens valve 404 to vent the cylinder counterbalance valves to a tank (not shown) after the adjustment is made. This ensures that the cylinder counterbalance valves seal properly in a manner that is well known in the art. Next, a pilot operated check valve 406 is opened thereby allowing hydraulic fluid to be ejected from the rod end of right hand track cylinder 20 via aperture 206. The hydraulic fluid which is ejected via aperture 206 then flows through check valve 406 and subsequently into the piston end of tie rod cylinder 30 via aperture 208 to impart longitudinal movement of piston rod 32 within tie rod cylinder 30. Thus, the corresponding piston rods 26 and 32 will be incremented in unit step with one another. Hydraulic fluid removed from the "rod end" of cylinder 30 via aperture 210 is routed through a shuttle valve 408 in the free flow direction, allowing hydraulic fluid to flow through control valve 300 back to tank (not shown).

Figure 9:
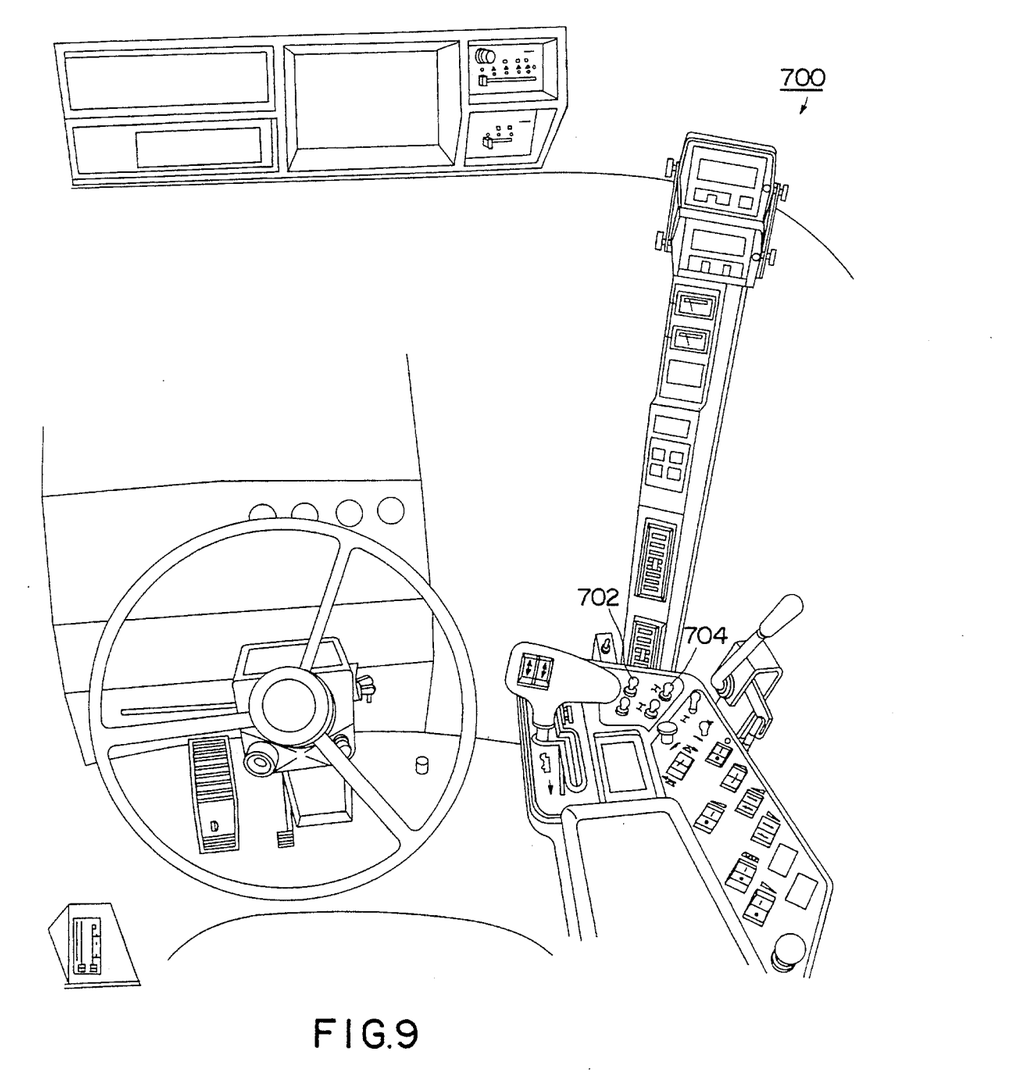
FIG. 9 is a perspective view illustrating typical operator controls for controlling adjustments of the front track assembly.

The above method of adjusting a front track on a vehicle having an engine and a front steerable axle assembly without a locking mechanism for locking the steerable axle assembly in a fixed steering position, is initiated and regulated with left and right front wheel control mechanisms such as control switches 702 and 704 as illustrated in FIG. 9, generally known to those skilled in the art, to energize a solenoid (not shown) in control valve 300, which shifts a valve spool to control the flow of hydraulic fluid to and from control valve 300 as described hereinbefore. The front track assembly is typically adjusted after first starting the vehicle engine and then putting the vehicle in motion. Once the vehicle is moving, the front track can be adjusted by activating the left front mechanism 702 while the right front mechanism 704 is deactivated until a desired front left track position is obtained, or by activating the right front mechanism 704 while the left front mechanism 702 is deactivated until a desired front right track position is obtained. The right front mechanism 704 can be activated to extend steering structure 16 for the right hand side of inventive assembly 10 as described above, for example.

Figure 5:
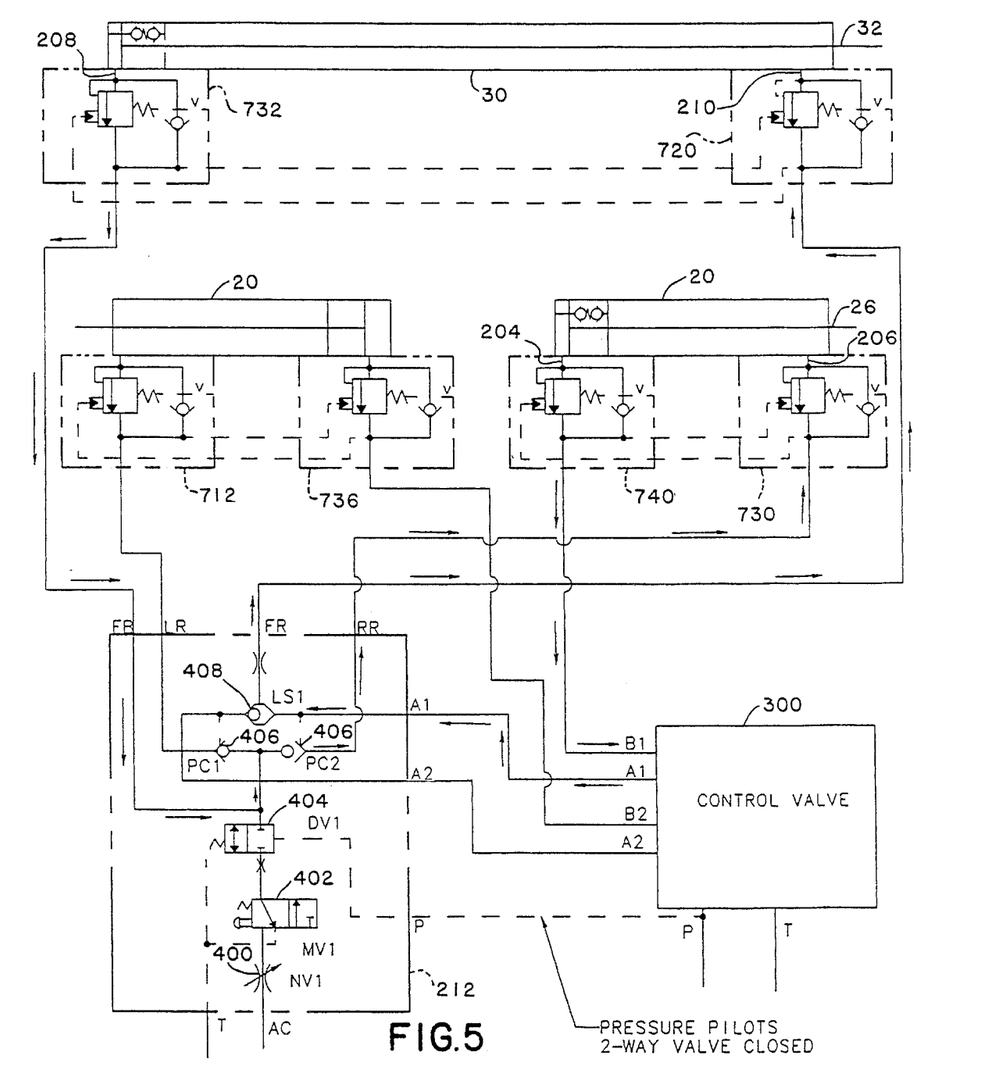
FIG. 5 is a schematic view of the hydraulic system for controlling each of the track adjust cylinders and the tie rod cylinder, illustrating hydraulic fluid flow during retraction of the right hand track adjust cylinder.

FIG. 5 illustrates hydraulic fluid routing during retraction of steering structure 16 for the right hand track. As stated hereinbefore, a pilot to close two-way valve 404 with an internal static drain port is piloted closed whenever the track is being adjusted and subsequently opens to vent the cylinder counterbalance valves to a tank (not shown) after the adjustment is made. This ensures that the cylinder counterbalance valves seal properly as stated hereinbefore. Initially, control valve 300 is activated to allow hydraulic fluid to pass via port A1 through a shuttle valve 408 which shifts to the position as shown in FIG. 5 when retracting the RH track to allow the hydraulic fluid to be injected into the tie rod 32 end of tie rod cylinder 30 via aperture 210. As tie rod 32 is being retracted, hydraulic fluid is being ejected from the other chamber of tie rod cylinder 30 via aperture 208. A pilot operated check valve 406 is piloted open thereby allowing the hydraulic fluid which is being displaced in tie rod cylinder 30 to be routed into the rod 26 end of right track adjust cylinder 20 via aperture 206. It can be seen that the hydraulic fluid injected into one chamber and removed from the other chamber of each cylinder 20 and 30 imparts longitudinal movement of the piston rods 26 and 32 within each respective cylinder housing 20 and 30. Thus, as indicated hereinbefore, the corresponding piston rods 26 and 32 will move in unit step with one another causing the right hand track assembly to retract in the instant case. During retraction of the right hand track assembly, control valve 300 operates to allow hydraulic fluid being ejected from right hand track adjusting cylinder 20 to exit cylinder 20 via aperture 204. Each rod 26 and 32 is secured into place when hydraulic fluid is not communicated due to counterbalance valves 712, 720 730, 732, 736, 740 at the cylinders sealing as stated hereinbefore.

The above method of adjusting a front track on a vehicle having an engine and a front steerable axle assembly without a locking mechanism for locking the steerable axle assembly in a fixed steering position, is initiated and regulated with left and right front wheel control mechanisms such as control switches 702 and 704 as illustrated in FIG. 9 and generally known to those skilled in the art, to energize a solenoid (not shown) in control valve 300, which shifts a valve spool, as stated hereinbefore, to control the flow of hydraulic fluid to and from control valve 300 as described hereinbefore. As stated above, the front track assembly is adjusted by activating the left front mechanism 702 while the right front mechanism 704 is deactivated until a desired front left track position is obtained, or by activating the right front mechanism 704 while the left front mechanism 702 is deactivated until a desired front right track position is obtained. The right front mechanism 704 can be activated to retract steering structure 16 for the right hand side of inventive assembly 10 as described above, for example. As stated above, the front track assembly is typically adjusted after first starting the vehicle engine and while the vehicle is moving.

Either or both sets of rods 26 and 32 can be selectively adjusted in the longitudinal direction in any number of positions between a minimum and maximum track width. Again, tie rod cylinder rod 32 and track adjust cylinder rod 26 are adjusted in step with the respective tubular member 14. Thus, the overall length of the front steering assembly 10 will be extended or retracted equally to the length adjustment of the axle housing formed by housing 12 and each tubular member 14.

Figure 6:
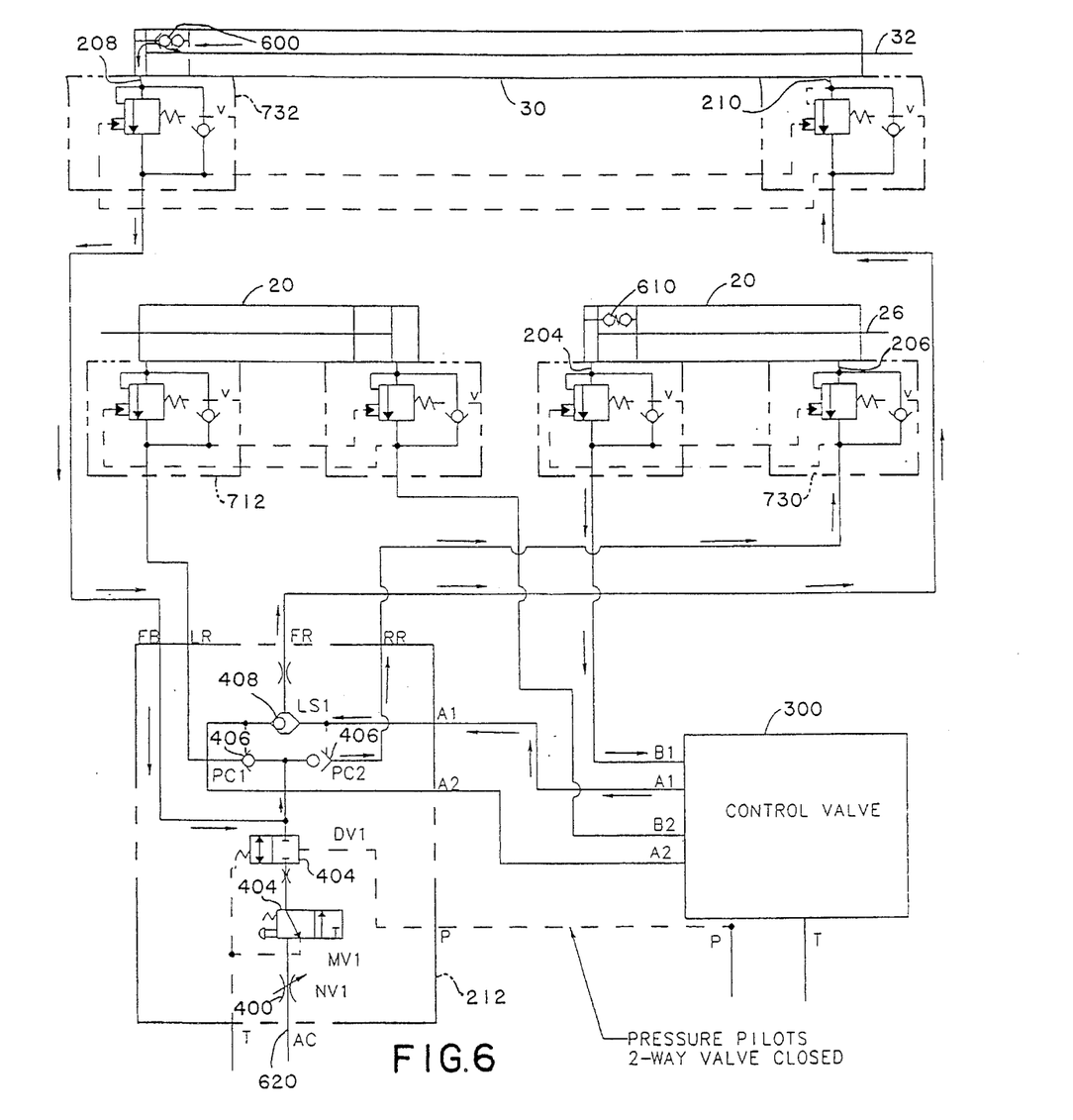
FIG. 6 is a schematic view of the hydraulic system for controlling each of the track adjust cylinders and the tie rod cylinder, illustrating hydraulic fluid flow to accomplish automatic "re-phasing" for correcting any cylinder drift that could cause the wheel toe-in adjustment to change.

Referring now to FIG. 6, operation of the preferred embodiment for the present inventive hydraulically adjustable front steering assembly 10 for automatically correcting errors in the toe-in adjustment caused by cylinder drift will be discussed in detail below. Although the hydraulic circuit shown in FIG. 6 uses track adjust cylinders 20 with 3.25" bores and 1.25" rods 26 and a tie rod cylinder 30 having a 3.00" bore, it is not to be inferred that these exact dimensions are necessary to practice the present invention. In the preferred embodiment, the rod end of the track adjust cylinder 20 has exactly the same area as the base end of the tie rod cylinder 30.

As stated hereinbefore, when extending the right hand track, the hydraulic fluid from the rod end of the right track adjust cylinder 20 is routed through an integrated circuit valve 212 into the base end of the tie rod cylinder 30. The two cylinders extend in unison.

When retracting the track, the hydraulic fluid from the base end of the tie rod cylinder 30 is routed through the integrated circuit valve 212 into the rod end of the track adjust cylinder 20 being actuated. The cylinders retract in unison.

The integrated circuit valve 212 consists of six valve cartridges. As stated hereinbefore, two pilot operated check valves 406 and a shuttle valve 408 open or close a flow path to route the hydraulic fluid as required. A pilot-to-close 2-way valve 404 with an internal static drain port is piloted closed whenever the track is being adjusted and opens to vent the cylinder counterbalance valves 732, 712, 730 to a tank (not shown) after the adjustment is completed. This, then ensures that the counterbalance valves 732, 712, 730 seal properly, as hereinbefore stated. The "AC" port 620 on the integrated circuit valve 212 is supplied with accumulator pressure from a parking brake circuit (not shown) on the applicator (not shown) in a manner commonly used in the art. The parking brake circuit and the applicator are not considered by the inventor to be a material part of the present invention, and therefore details are omitted for the sake of clarity.

A needle valve 400 and a manual 2-position, 3-way valve 402 are used to facilitate bleeding air out of the circuit after assembling or servicing the front wheel steering assembly 10. The needle valve 400 is completely closed at all times, except when bleeding air out of the circuit, and must be opened with a tool (not shown). Opening the needle valve 400 and pulling the manual valve 402 routes fluid from the brake accumulator circuit (not shown) into the "sequenced" portion of the automatic tie rod circuit to "power bleed" the circuit. Operation of the needle valve 400 and manual valve 402 are not considered by the inventor to be pertinent to the present inventive assembly, and therefore, any further details are omitted for the sake of clarity.

Row crop applicators are frequently adjusted to the narrow track position for traveling safely on public roads. The initial tie rod toe-in adjustment is made with the track in the narrowest position (all cylinders fully retracted). The present inventive hydraulically adjustable front track steering assembly 10 automatically corrects for cylinder drift when narrowing the track assembly 10 and ensures that all cylinders are fully retracted, as when the initial tie rod toe-in adjustment was made. This ensures optimum vehicle handling and minimal tire wear. The inventive automatically adjustable track assembly 10 is designed to automatically correct for errors in the toe-in adjustment which may be caused by cylinder drift. This procedure is known as "re-phasing".

With continued reference to the preferred embodiment illustrated in FIG. 6, this "re-phasing" procedure uses back-to-back check valves 600, 610 with mechanical pilot spools built into the tie rod cylinder 30 and the right hand track adjust cylinder 20. When adjusting the track to the narrow track position, the left hand track adjust cylinder rod 26 is always retracted first. When this cylinder rod 26 is fully retracted, the tie rod cylinder rod 32 also stops moving. At this point, the right hand track adjust cylinder rod 26 is retracted. Hydraulic fluid flows into the rod end of the tie rod cylinder 30 first. If the tie rod cylinder rod 32 were to be fully retracted before the right hand track adjust cylinder rod 26 (toe-in drift), the hydraulically "checked" check valve 600 in the tie rod cylinder 30 is piloted open mechanically. This allows hydraulic fluid to by-pass through the cylinder 30, and fully retract the right hand adjust cylinder rod 26.

In like manner, if the right hand track adjust cylinder rod 26 fully retracts first (toe-out drift), the internal check valve 610 in the track adjust cylinder 20 is mechanically piloted open, allowing hydraulic fluid to by-pass so that the tie rod cylinder 30 rod 32 fully retracts.

The above method of adjusting ("re-phasing" procedure) a front track on a vehicle having an engine and a front steerable axle assembly without a locking mechanism for locking the steerable axle assembly in a fixed steering position, is initiated and regulated with left and right front wheel control mechanisms such as control switches 702 and 704 as illustrated in FIG. 9 and generally known to those skilled in the art, to energize a solenoid (not shown) in control valve 300, which shifts a valve spool, as stated hereinbefore, to control the flow of hydraulic fluid to and from control valve 300 as described hereinbefore. As also stated above, the from track assembly is typically adjusted after first starting the vehicle engine and while the vehicle is moving. With the vehicle in motion, the above "re-phasing" procedure is then performed prior to adjusting the front vehicle track to a desired position, by first activating the left from wheel control mechanism 702 until the front left track is completely retracted as described hereinbefore. Following the complete retraction of the from left track, the right from wheel control mechanism 704 is activated until the front right track is completely retracted, again prior to adjusting the front vehicle track to a desired position, and while the vehicle is moving. Typically, the right front wheel control mechanism 704 is activated for at least 5 seconds after the front right track is completely retracted. This ensures that the original toe-in settings are re-established (hence, the term "re-phasing") prior to setting any new or desired front track position.

Figure 7:
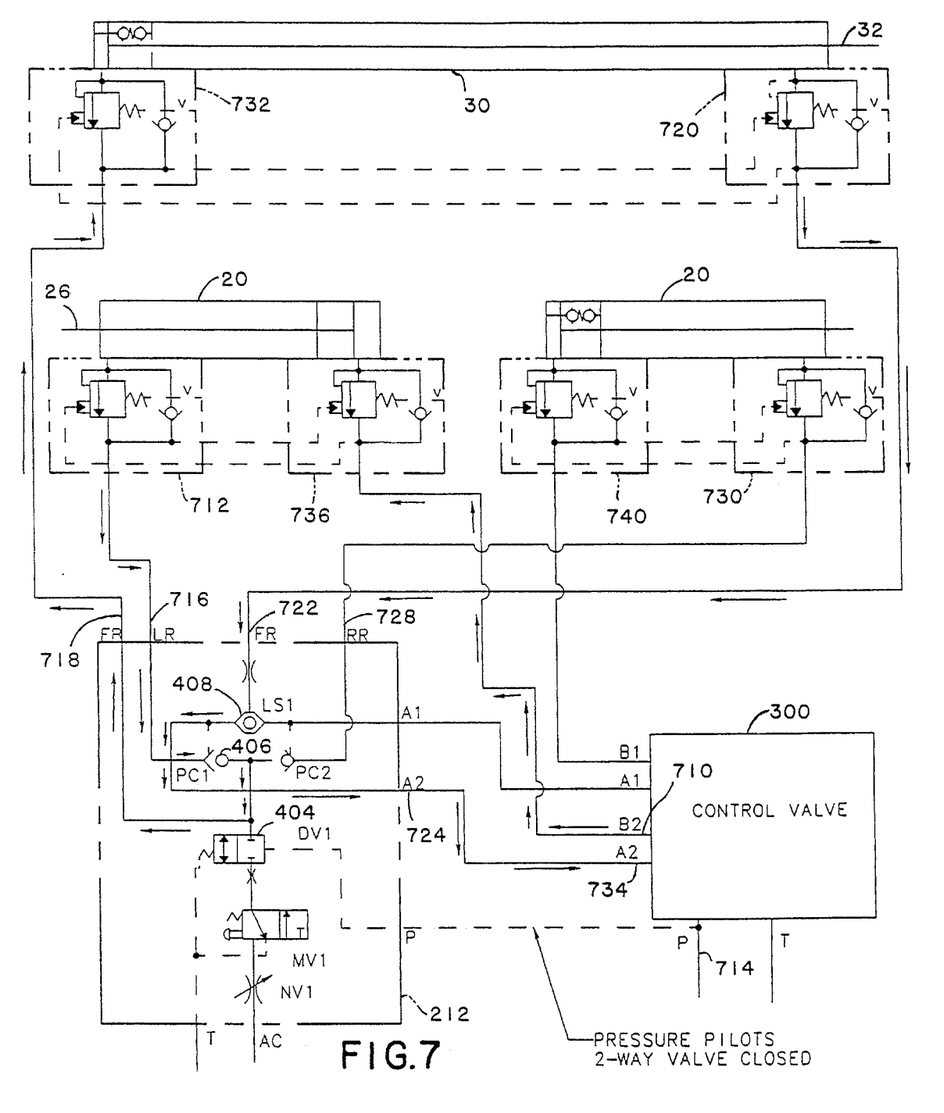
FIG. 7 is yet another schematic view of the hydraulic system for controlling each of the track adjust cylinders and the tie rod cylinder, illustrating hydraulic fluid flow during extension of the left track adjust cylinder.

In FIG. 7, a schematic diagram of the hydraulic system is illustrated to further clarify how hydraulic fluid is communicated between hydraulic control valve 300, tie rod cylinder 30 and each track adjust cylinder 20 to extend the left front track. Operating a control switch 702, as illustrated in FIG. 9, energizes a solenoid in control valve 300 which shifts a valve spool and directs hydraulic fluid out of port B2 (710). At the same time, the hydraulic pressure developed at port B2 (710) pilots open the counterbalance valve LV1 (712) at the rod end of the left track cylinder 20, and back pressure developed at the control valve 300 "P" line 714 pilots valve DV1 (404) closed. Next, the left hand track adjust cylinder rod 26 extends and hydraulic fluid from the rod end of the left track adjust cylinder 20 flows out of the cylinder 20 into port LR 716 of integrated circuit valve 212, thereby opening check valve PC1 (406), out of port FB 718, and on into the base end of the tie rod cylinder 30. Hydraulic pressure from the base end of tie rod cylinder 30 pilots open the counterbalance valve LV6 (720) at the rod 32 end of the tie rod cylinder 30. Hydraulic fluid then flows from the cylinder rod 32 end of tie rod cylinder 30 into the FR port 722 at the integrated circuit valve 212, through shuttle valve LS1 (408), out port A2 (724), and back to a tank (not shown).

Releasing the control switch 702 puts the control valve 300 back into a neutral position, which applies line B2 (710) and P 714 to tank (not shown). Valve DV1 (404) then moves to its normally open position. This vents lines LR 716, RR 728 and FB 718 to tank (not shown) thereby allowing counterbalance valves LV1 (712), LV4 (730) and LV5 (732) to seat and seal properly.

In like manner, operating the control switch 704 as illustrated in FIG. 9 energizes control valve 300 to extend or retract right front track assembly as described hereinbefore."

The above method of adjusting a from track on a vehicle having an engine and a from steerable axle assembly without a locking mechanism for locking the steerable axle assembly in a fixed steering position, is initiated and regulated with left and right front wheel control mechanisms such as control switches 702 and 704 as illustrated in FIG. 9 and generally known to those skilled in the art, to energize a solenoid (not shown) in control valve 300, which shifts a valve spool, as stated hereinbefore, to control the flow of hydraulic fluid to and from control valve 300 as described hereinbefore. As stated above, the front track assembly is adjusted by activating the left front mechanism 702 while the right front mechanism 704 is deactivated until a desired front left track position is obtained, or by activating the right from mechanism 704 while the left front mechanism 702 is deactivated until a desired front right track position is obtained. The left front mechanism 702 can be activated to extend steering structure 16 for the left hand side of inventive assembly 10 as described above, for example. As also stated above, the front track assembly is typically adjusted after first starting the vehicle engine and while the vehicle is moving.

Figure 8:
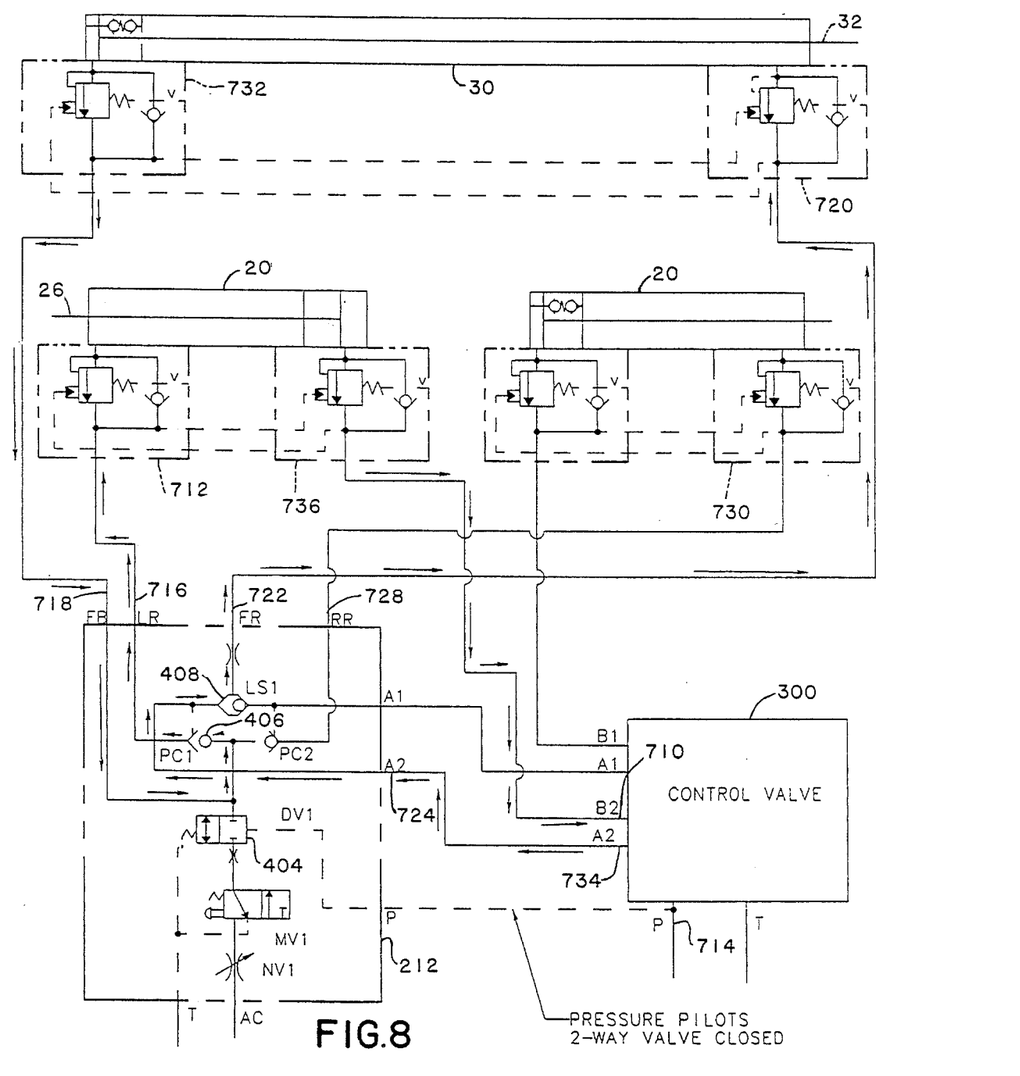
FIG. 8 is a schematic view of the hydraulic system for controlling each of the track adjust cylinders and the tie rod cylinder, illustrating hydraulic fluid flow during retraction of the left track adjust cylinder.

With reference to FIG. 8, and for the sake of completeness, operation of the preferred embodiment for the present inventive hydraulically adjustable track assembly 10 will be discussed in considerable detail to accomplish retraction of the left front track assembly. Operating the control switch 702 energizes a solenoid in control valve 300 which shifts a valve spool and directs hydraulic fluid out of port A2 (734), through shuttle valve LS1 (408). At the same time, back pressure developed at the control valve 300 "P" line 714 pilots valve DV1 (404) closed, and pilot check valve PC1 (406) is piloted open. Hydraulic fluid then flows into the rod 32 end of the tie rod cylinder 30. Counterbalance valve LV5 (732) is piloted open, allowing hydraulic fluid to flow from the base end of the tie rod cylinder 30 into port FB 718, through check valve PC1 (406) in the reverse direction, out of port LR 716 and into the rod 26 end of the left track cylinder 20. Subsequently, counterbalance valve LV2 (736) is piloted open, allowing hydraulic fluid to flow out of the base end of the left track cylinder 20 through port B2 (710) and back to the tank (not shown).

Releasing the control switch 702 puts the control valve 300 spool back to neutral, which applies lines A2 (734) and P 714 to tank (not shown). Valve DV1 (704) then moves to its normally open position. This vents lines LR 716, RR 728 and FB 718 to tank (not shown), thereby allowing counterbalance valves LV1 (712), LV4 (730) and LV5 (732) to seat and seal properly.

The above method of adjusting a from track on a vehicle having an engine and a front steerable axle assembly without a locking mechanism for locking the steerable axle assembly in a fixed steering position, is initiated and regulated with left and right front wheel control mechanisms such as control switches 702 and 704 as illustrated in FIG. 9 and generally known to those skilled in the art, to energize a solenoid (not shown) in control valve 300, which shifts a valve spool, as stated hereinbefore to control the flow of hydraulic fluid to and from control valve 300 as described hereinbefore. As stated above, the front track assembly is adjusted by activating the left front control mechanism 702 while the right front control mechanism 704 is deactivated until a desired front left track position is obtained, or by activating the right front control mechanism 704 while the left front control mechanism 702 is deactivated until a desired front right track position is obtained. The left front mechanism 702 can be activated to retract steering structure 16 for the left hand side of inventive assembly 10 as described above, for example. As also stated above, the front track assembly is typically adjusted after first starting the vehicle engine and while the vehicle is moving.

Figure 10:
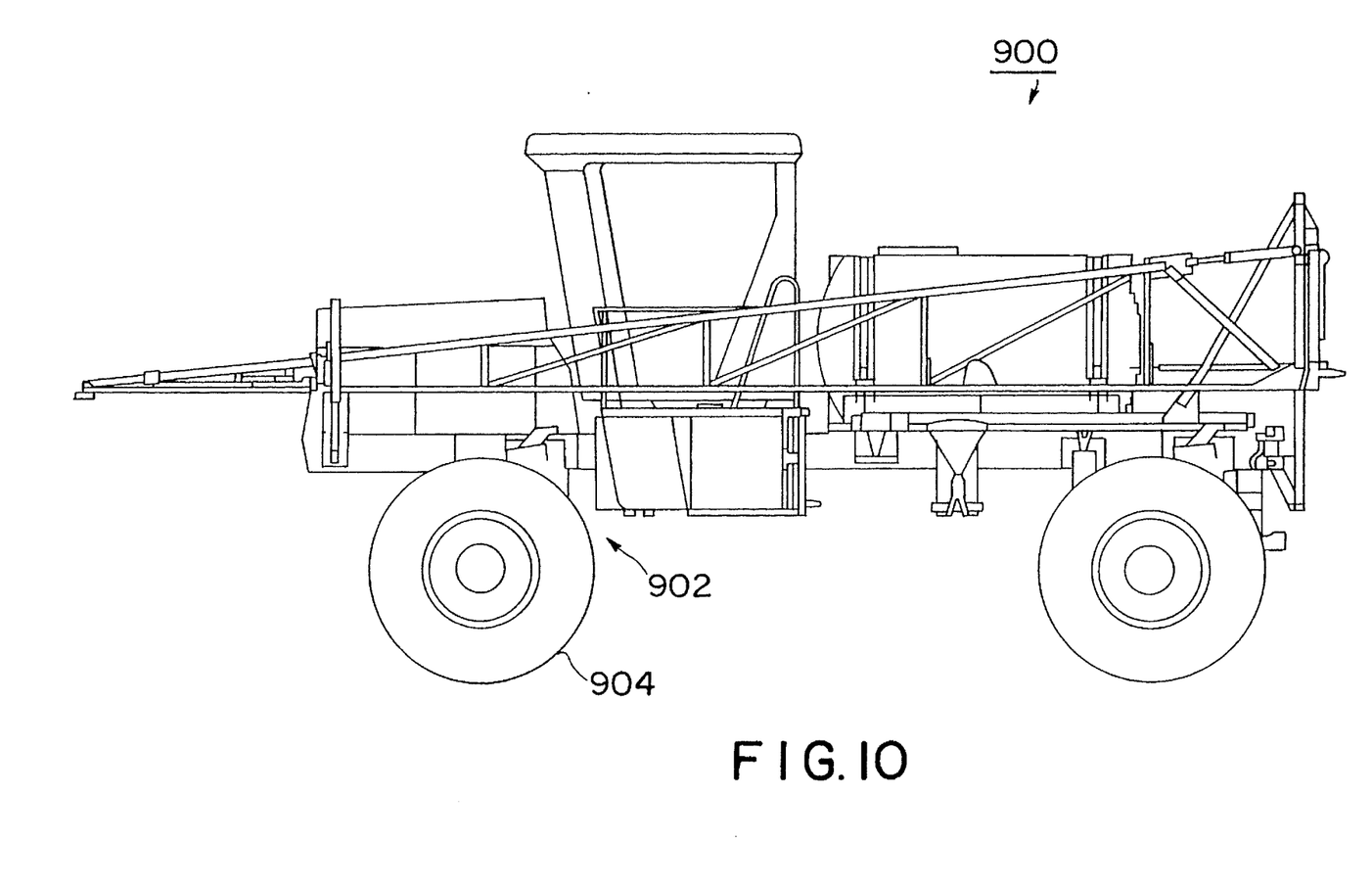
FIG. 10 is a side view of a typical four wheeled row crop applicator having an adjustable track width including an adjustable tie rod assembly adjustable in any size increments between a minimum and maximum track width.

Referring now to FIG. 10, a side view of a row crop applicator vehicle is generally shown at 900. Vehicle 900 has a front steering axle assembly generally shown at 902, wherein a pair of wheels 904 define a track width. The track width is adjustable between an inner most and outer most position, typically 120 to 152 inches, using the preferred embodiment for the present invention which has hereinbefore been described in considerable detail.

In summary, a variable hydraulically adjustable front steering assembly 10 has been described in considerable detail, which can be extended or retracted in unison with the steering axle assembly in any size increments between a minimum and maximum track width to set the track width. Since the front steering assembly 10 is adjustable in any size increments between a maximum and a minimum track width position, the operator can set a precise track width which is appropriate for the field to be treated. The from steering assembly 10 can therefore be extended or retracted to compensate for the loading of the tractor.

A further feature of the present invention is the unique "re-phasing" procedure using back-to-back check valves 600, 610 with a mechanical pilot spool built into the tie rod cylinder 30 and the right hand track adjust cylinder 20 to automatically correct for error in the toe-in adjustment caused by cylinder drift.

Yet, another feature of the present invention is the elimination of any need for any unique locking features to mechanically lock the steering structure in a fixed position while adjusting the track width to any track width setting while the vehicle is moving forward or negotiating a turn.

From the foregoing detailed description of a particular embodiment of the invention, it should be apparent that a hydraulically adjustable front steering assembly has been disclosed which is provided with the capability of automatically correcting for any cylinder drift that could cause the wheel toe-in adjustment to change on a vehicle, such as a row crop applicator having a steering structure with an adjustable track width. It should also be apparent that the associated hydraulically adjustable tie rod assembly can be adjusted in any size increments, while driving the machine, in a secure arrangement between a first and second track width setting, without the need to mechanically lock the steering structure while making the adjustment.

This invention has been described herein in considerable detail in order to comply with the Patent Statutes and to provide those skilled in the art with the information needed to apply the novel principles and to construct and use such specialized components as are required. However, while a particular embodiment of the present invention has been described herein in detail, it is to be understood that various alternations, modifications and substitutions can be made therein without departing from the spirit and scope of the present invention, as defined in the claims which follow. For example, it is contemplated by the inventor that powered solenoid valves could easily be substituted for hydraulically operated valves and that any manually operated valve could just as easily be other types. Those skilled in the art will recognize that the counterbalance valves used in the present inventive system could also be pilot operated check valves or that the inventive system could function just as efficiently without using any counterbalance valves since the counterbalance valves have been added to the inventive system as simply a safety feature.

Those skilled in the art will also recognize that many of the aspects of the present invention are applicable to other types of vehicles which are designed for agricultural use, for example, vehicles used in furrowing around hills in a spiral fashion, as the vehicle moves up and down the hill.

It is also contemplated by the inventor, for example, that alterations to the tie rod arrangement and shuttle valve arrangement could be made which would also allow simultaneous, in addition to simply individual, adjustments of the left hand and right hand track assemblies to set a new track width.

I claim:

1. A vehicle, comprising:

(a) a steerable axle assembly, said steerable axle assembly being extendable in a longitudinal direction to any position between a first and a second position, said steerable axle assembly comprising at least one cylinder having an extendable piston rod axially and slidably disposed therewithin, said at least one axle assembly cylinder having a base end and a rod end;

(b) tie rod means coupled to said steerable axle assembly for establishing a toe-in relationship of said steerable axle assembly, said tie rod means being extendable in a longitudinal direction to any position between said first and said second position as said steerable axle assembly is extended between said first and said second position, said tie rod means comprising at least one cylinder having an extendable rod axially and slidably disposed therewithin, said at least one tie rod cylinder having a base end and a rod end, said base end of said at least one tie rod cylinder having an area equal the area of said rod end of said at least one axle assembly cylinder; and (c) means coupled to said steerable axle assembly and further coupled to said tie rod means for extending said steerable axle assembly in the longitudinal direction between said first and said second position, and further for extending said tie rod means in the longitudinal direction in step unison with said steerable axle assembly as said steerable axle assembly is extended between said first and said second position while said vehicle is moving in any direction, such that said established toe-in relationship is maintained during said extension of said steerable axle assembly.

2. The vehicle as specified in claim 1 further comprising means for adjusting said extending means to a fixed initial position, such that said established toe-in relationship is secured.

3. The vehicle as specified in claim 2 wherein said adjusting means comprises means for fully retracting said at least one tie rod cylinder piston rod following a complete retraction of said at least one axle assembly cylinder piston rod.

4. The vehicle as specified in claim 3 wherein said adjusting means further comprises means for fully retracting said at least one axle assembly cylinder piston rod following a complete retraction of said at least one tie rod cylinder piston rod.

5. The vehicle as specified in claim 1 further comprising means coupled to said at least one tie rod cylinder and said at least one axle assembly cylinder for imparting longitudinal movement of said tie rod cylinder piston rod and said axle assembly cylinder piston rod.

6. The vehicle as specified in claim 5 wherein said imparting means comprises a hydraulic circuit.

7. The vehicle as specified in claim 1 further comprising means for controlling said extending means, such that a length of said tie rod means and a length of said steerable axle assembly are regulated between said first position and said second position.

8. A method of adjusting a front track on a vehicle having an engine, a hydraulic front tie rod assembly adjustable to any position between a minimum and a maximum position, a hydraulic front steerable axle assembly without a locking mechanism for locking said steerable axle assembly in a fixed steering position, said axle assembly being adjustable to any position between said minimum and said maximum position, and a left and right from wheel control mechanism for regulating a from left and right track position for said vehicle, which comprises:

(a) first, starting said vehicle engine;

(b) second, starting said vehicle moving;

(c) with said vehicle in motion, and while leaving said steerable axle assembly free to negotiate a turn, activating said left from wheel control mechanism while said right from wheel control mechanism is deactivated, thereby adjusting a left from track, until a desired from left track position is obtained; and (d) with said vehicle in motion, and while leaving said steerable axle assembly free to negotiate a turn, activating said right from wheel control mechanism while said left front wheel control mechanism is deactivated, thereby adjusting a right front track, until a desired from right track position is obtained.

9. The method as specified in claim 8 further comprising:
(a) with said vehicle in motion, and before any said desired front track position is obtained, activating said left front wheel control mechanism until said front left track is completely retracted;
(b) with said vehicle in motion, activating said right front wheel control mechanism until said front right track is completely retracted before any said desired front track position is obtained following said complete retraction of said front left track; and
(c) with said vehicle in motion, continuing to activate said right front wheel control mechanism for at least 5 seconds before any said desired front track position is obtained after said front right track is completely retracted.

10. A method of operating a hydraulic circuit for extending a left front track on a vehicle having a hydraulically driven front tie rod cylinder including a tie rod cylinder axially and slidably disposed therewithin, said tie rod cylinder being adjustable to any position between a minimum and a maximum position, a hydraulically driven front left track adjust cylinder including a front left track adjust cylinder rod axially and slidably disposed therewithin, said track adjust cylinder being adjustable to any position between said minimum and said maximum position and a hydraulic fluid reservoir, the steps comprising:
(a) applying a hydraulic pressure to a base end of said left track adjust cylinder such that a hydraulic fluid is expended from a rod end of said left track adjust cylinder;
(b) directing said hydraulic fluid expended from said left track adjust cylinder into a base end of said tie rod cylinder such that a hydraulic fluid is expended from a rod end of said tie rod cylinder; and
(c) directing said hydraulic fluid expended from said tie rod cylinder into said hydraulic fluid reservoir.

11. A method of operating a hydraulic circuit for extending a right front track on a vehicle having a hydraulically driven front tie rod cylinder including a tie rod cylinder rod axially and slidably disposed therewithin, said tie rod cylinder being adjustable to any position between a minimum and a maximum position, a hydraulically driven front right track adjust cylinder including a front right track adjust cylinder rod axially and slidably disposed therewithin, said track adjust cylinder being adjustable to any position between said minimum and said maximum position, and a hydraulic fluid reservoir comprising:
(a) applying a hydraulic pressure to a base end of said right track adjust cylinder such that a hydraulic fluid is expended from a rod end of said right track adjust cylinder;
(b) directing said hydraulic fluid expended from said right track adjust cylinder into a base end of said tie rod cylinder such that hydraulic fluid is expended from a rod end of said tie rod cylinder; and
(c) directing said hydraulic fluid expended from said tie rod cylinder into said hydraulic fluid reservoir.

12. A method of operating a hydraulic circuit for retracting a left front track on a vehicle having a hydraulically driven front tie rod cylinder including a tie rod cylinder axially and slidably disposed therewithin, said tie rod cylinder being adjustable to any position between a minimum and a maximum position, a hydraulically driven front left track adjust cylinder including a front left track adjust cylinder rod axially and slidably disposed therewithin, said track adjust cylinder being adjustable to any position between said minimum and said maximum position, and a hydraulic fluid reservoir comprising:
(a) applying a hydraulic pressure to a rod end of said front tie rod cylinder such that a hydraulic fluid is expended from a base end of said front tie rod cylinder;
(b) directing said hydraulic fluid expended from said front tie rod cylinder into a rod end of said left track adjust cylinder such that a hydraulic fluid is expended from a base end of said left track adjust cylinder; and
(c) directing said hydraulic fluid expended from said left track adjust cylinder into said hydraulic fluid reservoir.

13. A method of operating a hydraulic circuit for retracting a right front track on a vehicle having a hydraulically driven front tie rod cylinder including a tie rod cylinder rod axially and slidably disposed therewithin, said tie rod cylinder being adjustable to any position between a minimum and a maximum position, a hydraulically driven from right track adjust cylinder including a front right track adjust cylinder rod axially and slidably disposed therewithin, said track adjust cylinder being adjustable to any position between said minimum and said maximum position and a hydraulic fluid reservoir comprising:
(a) applying a hydraulic pressure to a rod end of said from tie rod cylinder such that a hydraulic fluid is expended from a base end of said front tie rod cylinder;
(b) directing said hydraulic fluid expended from said front tie rod cylinder into a rod end of said right track adjust cylinder such that a hydraulic fluid ex expended from a base end of said right track adjust cylinder; and
(c) directing said hydraulic fluid expended from said right track adjust cylinder into said hydraulic fluid reservoir.

14. A method of operating a closed loop hydraulic circuit for "re-phasing" a front track on a vehicle such that a preset toe-in adjustment is ensured, wherein said hydraulic circuit includes a hydraulically driven front tie rod cylinder having a tie rod cylinder rod axially and slidably disposed therewithin, said front tie rod cylinder further including a "re-phasing" check valve assembly operably associated with a base end of said tie rod cylinder, said tie rod cylinder being adjustable to any position between a minimum and a maximum position, a hydraulically driven from left track adjust cylinder including a from left track adjust cylinder rod axially and slidably disposed therewithin, said left track adjust cylinder being adjustable to any position between a predetermined minimum and a predetermined maximum position, and a hydraulically driven front right track adjust cylinder including a front right track adjust cylinder rod axially and slidably disposed therewithin, said right track adjust cylinder being adjustable to any position between a predetermined minimum and a predetermined maximum position, and further including a "re-phasing" check valve assembly operably associated with a base end of said right track adjust cylinder comprising:
(a) first, fully retracting said left track adjust cylinder rod;
(b) second, retracting said right track adjust cylinder rod until any one of said "re-phasing" valve assemblies is piloted open, thereby allowing hydraulic fluid to flow through said open "re-phasing" valve assembly and into said cylinder having a closed "re-phasing" valve assembly; and
(c) continuing to retract said right track adjust cylinder rod until said tie rod cylinder and said right track adjust cylinder assembly are both fully retracted.

\* \* \* \* \*